United States Patent [19]

Dowler

[11] Patent Number: 5,211,695
[45] Date of Patent: May 18, 1993

[54] FEEDTHROUGH SLEEVE AND INTEGRAL SUPPORT FITTING

[75] Inventor: Robert L. Dowler, New Haven, Ind.

[73] Assignee: Navistar International Transportation Corp., Chicago, Ill.

[21] Appl. No.: 885,321

[22] Filed: May 18, 1992

[51] Int. Cl.⁵ .............................................. F16L 3/04
[52] U.S. Cl. .................... 285/162; 285/192; 285/201; 285/921; 285/215; 285/216; 16/2; 248/56; 174/65 G; 174/152 G; 174/153 G
[58] Field of Search ............... 285/201, 205, 162, 192, 285/194, 196, 921, 215, 216; 245/56, 57; 277/178; 16/2; 174/65 G, 152 G, 153 G, 153 R, 172 G

[56] References Cited

U.S. PATENT DOCUMENTS

| | | | |
|---|---|---|---|
| 342,225 | 5/1886 | Roberts | 285/201 X |
| 1,085,889 | 2/1914 | Carl | 285/201 X |
| 1,724,959 | 8/1929 | Page, Jr. et al. | 277/178 X |
| 1,800,578 | 4/1931 | Webb | 16/2 X |
| 2,039,009 | 4/1936 | Lampman et al. | 16/2 X |
| 2,114,811 | 4/1938 | Reid | 285/192 X |
| 2,592,949 | 4/1952 | Philipson | 285/192 X |
| 2,897,533 | 8/1959 | Bull et al. | 248/56 X |
| 3,135,535 | 6/1964 | Shepard | 248/56 X |
| 3,277,234 | 10/1966 | Dekko et al. | 16/2 X |
| 3,580,988 | 5/1971 | Orlowski | 277/178 X |
| 3,768,115 | 10/1973 | Hoffmann et al. | 248/56 X |
| 4,323,166 | 4/1982 | Maeroff | 285/162 X |
| 4,763,541 | 8/1988 | Spease | 248/56 X |

FOREIGN PATENT DOCUMENTS

| | | | |
|---|---|---|---|
| 0089867 | 9/1983 | European Pat. Off. | 285/192 |
| 2113284 | 9/1972 | Fed. Rep. of Germany | 285/192 |
| 0022151 | of 1900 | United Kingdom | 285/192 |
| 0554167 | 6/1943 | United Kingdom | 248/56 |

Primary Examiner—Eric K. Nicholson
Assistant Examiner—Heather Chun
Attorney, Agent, or Firm—Dennis K. Sullivan

[57] ABSTRACT

A feedthrough sleeve and integral support fitting comprises a hollow tubular sleeve and integral planar mounting collar. The sleeve lies in a plane transverse to the plane of the collar which is less than perpendicular thereto. The collar is configured to be engaged in a snap fit manner within an opening in a surface, such as a bulkhead of a truck, with the sleeve being mounted in a manner to allow an elongated member, such as a hose, wire or tubing, to be fed therethrough from one side of the bulkhead to the other, without requiring the need for splicing of or creating a joint in the elongated member to provide feedthrough thereof.

4 Claims, 1 Drawing Sheet

5,211,695

FEEDTHROUGH SLEEVE AND INTEGRAL SUPPORT FITTING

BACKGROUND OF THE INVENTION

The present invention relates to a feedthrough sleeve and integral support fitting which provides a means for feeding a continuous wire, hose or tubing through a rigid member, such as a bulkhead of a truck.

THE PRIOR ART

Heretofore, typical feedthrough fittings have included an arrangement comprising two elbows, two anchor couplings, two sleeves and two nuts which have required a significant amount of time to engage to one another appropriately in an area where a feedthrough is required. Also, it has been required in use of such fittings to create a joint in the element being fed through the fitting, creating the potential of a leak developing in the joint area when the element, for example, is a tubing.

As will be described in greater detail hereinafter, the feedthrough sleeve and integral support fitting of the present invention provides a device which is fixable to and within a conformed opening in a structure for passing an uninterrupted element therethrough. The element enters the sleeve at one end, on one side of the support fitting and exits the sleeve at the other end, on the other side of the support fitting, continuing in its original direction, with only a minimal protrusion of the sleeve into the area adjacent the device.

SUMMARY OF THE INVENTION

According to the invention, there is provided a feedthrough sleeve and integral planar support fitting for the sleeve, said sleeve lying in a plane transverse to the plane of the fitting but less than perpendicular thereto and having ends opening to a respective planar side of the fitting.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
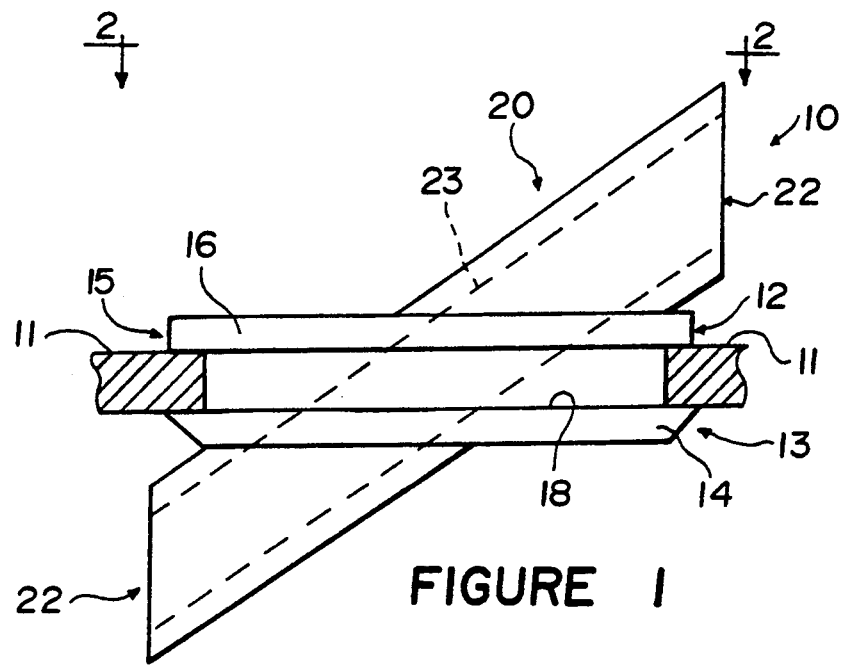
FIG. 1 is a top plan view of the feedthrough sleeve and integral support fitting of the present invention.
Figure 2:
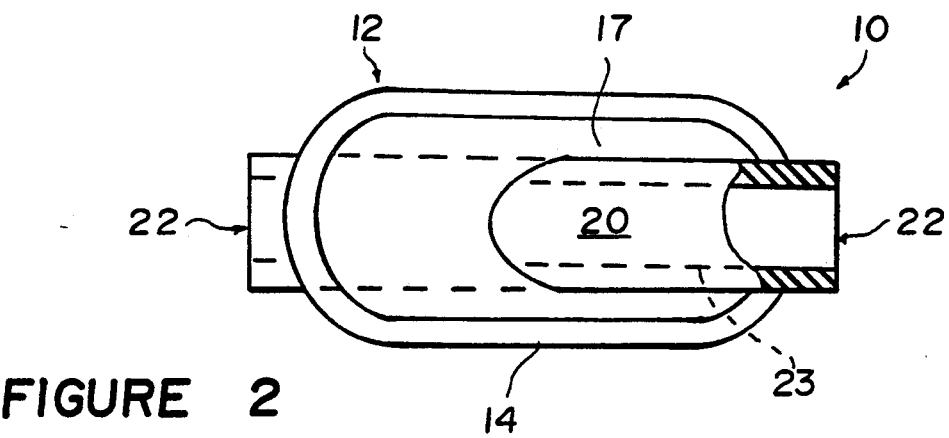
FIG. 2 is a side view of the fitting of FIG. 1 and is taken along line 2—2 of FIG. 1.

Referring now to the drawings in greater detail, there is illustrated in the drawings, a feedthrough sleeve and integral support fitting 10 of the present invention shown mounted in a truck frame bulkhead shown partially at 11.

As shown, the fitting 10 includes an integral mounting means in the form of a mounting collar 12 having an oval planar body portion 17 with a narrow outturned U-shaped peripheral groove 18 which engages within an appropriately formed aperture in the bulkhead 11. One wall 13 of the mounting collar 12 is provided with a beveled flange 14 to assist insertion in the bulkhead 11 and the other wall 15 with a squared-edge flange 16, creating the square peripheral groove 18 within which the bulkhead 11 is received as shown in FIG. 1.

The fitting 10 further includes a hollow tubular sleeve 20 passing through the body portion 17 and integrally formed therewith which has an axis transverse to the plane of the mounting collar 12 and disposed at an acute angle relative thereto, preferably at an angle of between 30° and 45°. As shown, the sleeve 20 has each open end 22 thereof positioned to be as close as possible to the respective longitudinal ends of the oval collar 12, without interfering with the conformation of the flanges 14 and 16 of the collar 12.

In this manner, each end 22 of the sleeve 20 extends outwardly of a planar side of the collar 12 opposite to the other end 22 and is only minimally intrusive into the surrounding area when the fitting 10 is mounted for use as will be described in greater detail hereinafter.

The fitting 10 may be used to pass a wide variety of elongated members through the bulkhead 11 including, but not limited to, wires, hoses and tubes. These elements, when used on a vehicle, such as a truck, typically have outer dimensions somewhere in the range of ⅜ to ⅝ inch. The sleeve 20 is provided with a longitudinal throughbore 23 having a sufficiently large diameter to enable one or more elongated members to be fed therethrough, to maintain the position thereof relative to the bulkhead 11.

In use of the fitting 10, an opening, as described above, is formed in a wall, such as the bulkhead 11 of a truck frame, through which an elongated member, such as a wire, wiring harness, or a hose, is to be fed. The mounting collar 12 will be engaged within the opening in the bulkhead 11 by pushing the beveled flange 14 into and through the opening until the rim of the opening engages within the circumferential groove 18 of the mounting collar 12 in a snap lock or snap fit manner. It will be understood that in order to accomplish such engagement, the fitting 10 necessarily must be made of a semirigid material, such as semirigid plastic, which holds its shape and which will allow a slight deformation thereof during engagement.

Once the mounting collar 12 is engaged in such manner, the elongated member to be fed through and maintained within the sleeve 20 is fed through the bore 23 in the hollow sleeve 20 in a continuous manner.

After installation of elongated member in the fitting 10, appropriate connector structures may be added to each end of the elongated member, eliminating the need for intermediate connections in the elongated member and thereby preventing any potential of leakage such as, for example, when the elongated member is a water or air hose.

Preferably, the inner diameter of the sleeve 20 to be used with a particular elongated member is only slightly larger than the outer diameter of the elongated member so that it is held within the sleeve by friction, thus making its position in the sleeve relatively permanent. This is believed to be important to prevent crimping of the elongated member. Also, because the elongated member travels in a substantially straight line through the sleeve 20, toward its destination from its source, kinking of an elongated member such as a hose or tube is avoided.

As described above, the fitting 10 of the present invention has a number of advantages some of which have been described above and others of which are inherent in the invention. For example, the simplicity of the fitting 10 creates a product which is substantially less expensive to manufacture when compared to the cost of the multitude of parts presently utilized to form a feedthrough.

It will be apparent to those of ordinary skill in the art, in view of the foregoing disclosure, that various modifications can be made to the fitting 10 without departing from the teachings of the present invention. For example, although the mounting collar is disclosed as having a solid web portion disposed around the sleeve, the sleeve could be mounted to the collar portion by beam portions to produce apertures through the mounting collar. Accordingly, the scope of the invention should only be limited as necessitated by the accompanying claims.

What is claimed is:

1. An elongated feedthrough and support fitting for passing an elongated member through a vehicle bulkhead comprising an integral simirigid plastic structure having:
    an oval planar support portion, said support portion having a periphery including means for engaging a surrounding wall structure, and
    a rigid tubular sleeve portion integrally formed in said support portion and extending to distal ends disposed on both sides of said support portion, said sleeve portion being disposed at an acute angle to the plane of the fitting and defining an elongated throughbore having a length longer than its inside diameter extending therethrough between said distal ends and having an inside diameter of between ⅜ and ⅝ inch.

2. An elongated feedthrough and support fitting for passing an elongated member through a vehicle bulkhead comprising an integral semirigid plastic structure having:
    an oval planar support portion, said support portion having a periphery including means for engaging a surrounding wall structure, and
    a rigid tubular sleeve portion integrally formed in said support portion and extending to distal ends disposed on both sides of said support portion and outside of the periphery thereof but in close proximity to a longitudinal end thereof, said sleeve portion being disposed at an acute angle to the plane of the fitting and defining an elongated throughbore of relatively small diameter extending therethrough between said distal ends.

3. The support fitting of claim 2 wherein said fitting is disposed at an angle of less than 45° to said support portion.

4. The support fitting of claim 3 wherein said throughbore has a diameter of between ⅜ and ⅝ inch.

* * * * *